(12) United States Patent
Horvat et al.

(10) Patent No.: US 7,027,424 B1
(45) Date of Patent: Apr. 11, 2006

(54) METHOD FOR AVOIDING INTERFERENCE IN A DIGITAL COMMUNICATION SYSTEM

(75) Inventors: Dion Horvat, New Westminster (CA); Milosh Koprivica, Richmond (CA); Sarkis Teghararian, Vancouver (CA); Ralph Tischler, Surrey (CA)

(73) Assignee: VTech Communications, Ltd., Tai Po (HK)

( * ) Notice: Subject to any disclaimer, the term of this patent is extended or adjusted under 35 U.S.C. 154(b) by 0 days.

(21) Appl. No.: 09/578,140

(22) Filed: May 24, 2000

(51) Int. Cl.
*H04B 7/212* (2006.01)

(52) U.S. Cl. .................. 370/337; 370/347; 455/63.1

(58) Field of Classification Search ................ 370/337, 370/347, 462, 445; 375/357
See application file for complete search history.

(56) References Cited

U.S. PATENT DOCUMENTS

| | | | |
|---|---|---|---|
| 3,697,782 A * | 10/1972 | Matouka | 327/28 |
| 4,193,030 A | 3/1980 | Rabow et al. | |
| 4,286,334 A | 8/1981 | Gammel et al. | |
| 4,353,065 A | 10/1982 | Mori | |
| 4,355,399 A | 10/1982 | Timor | |
| 4,479,125 A | 10/1984 | Mori | |
| 4,529,980 A | 7/1985 | Liontine et al. | |
| 4,558,453 A | 12/1985 | Mimken | |
| 4,606,040 A | 8/1986 | David et al. | |
| 4,663,623 A | 5/1987 | Lax et al. | |
| 4,663,765 A | 5/1987 | Sutphin et al. | |
| 4,740,962 A | 4/1988 | Kish, III | |
| 4,745,408 A | 5/1988 | Nagata et al. | |
| 4,746,870 A | 5/1988 | Underhill | |
| 4,763,339 A | 8/1988 | Sutphin et al. | |
| 4,783,654 A | 11/1988 | Ichikawa | |
| 4,937,822 A | 6/1990 | Weddle et al. | |
| 5,029,180 A | 7/1991 | Cowart | |

(Continued)

FOREIGN PATENT DOCUMENTS

DE         195 26 549 A1      2/1996

(Continued)

OTHER PUBLICATIONS

Bray et al. "Bluetooth Connect Without Cables", 41-61, 91-100, 191-217 (Prentice-Hall Inc, New Jersey, 2001).

(Continued)

*Primary Examiner*—Chau Nguyen
*Assistant Examiner*—Ian N. Moore
(74) *Attorney, Agent, or Firm*—Pillsbury Winthrop Shaw Pittman LLP

(57) ABSTRACT

A technique for time domain avoidance of communications link interference sources characterized by intermittent, periodic short bursts of energy. A transmitting source can be assigned two time slots within a time domain multiple access data frame over which each data packet can be transmitted. The time slots are separated by a duration greater than that of an interference burst, such that an interference burst does not affect both time slots in any given frame. Therefore, the data packet can be received on at least one of the two assigned time slots. Transmitter power consumption can be reduced by calculating the timing of the periodic interference bursts, and only transmitting a data packet on one of the two assigned time slots that will not coincide with an interference burst in each frame. Communications link capacity can be improved during the presence of interference by synchronizing the data frame to the timing of the interference bursts. The bursts then occupy fixed time slots in each data frame, enabling standard single time slot transmissions for the remaining communications channels in the data frame.

13 Claims, 4 Drawing Sheets

U.S. PATENT DOCUMENTS

| | | |
|---|---|---|
| 5,144,668 A | 9/1992 | Malek et al. |
| 5,285,443 A | 2/1994 | Patsiokas et al. |
| 5,297,203 A | 3/1994 | Rose et al. |
| 5,303,260 A | 4/1994 | Fonnesbeck et al. |
| 5,307,371 A | 4/1994 | Juola |
| 5,323,447 A | 6/1994 | Gillis et al. |
| 5,339,331 A | 8/1994 | Beauchamp et al. |
| 5,345,600 A | 9/1994 | Davidson |
| 5,371,783 A | 12/1994 | Rose et al. |
| 5,400,369 A | 3/1995 | Ikemura |
| 5,436,906 A | 7/1995 | Kasuya et al. |
| 5,504,750 A | 4/1996 | Fulghum et al. |
| 5,541,954 A | 7/1996 | Emi |
| 5,574,979 A * | 11/1996 | West .................. 455/63 |
| 5,600,629 A | 2/1997 | Van Daele et al. |
| 5,661,764 A | 8/1997 | Nakajima |
| 5,737,359 A | 4/1998 | Koivu |
| 5,809,059 A | 9/1998 | Souissi et al. |
| 5,870,391 A | 2/1999 | Nago |
| 5,956,377 A | 9/1999 | Lang |
| 6,115,407 A | 9/2000 | Gendel et al. |
| 6,229,432 B1 * | 5/2001 | Fridley et al. ......... 340/310.01 |
| 6,252,464 B1 | 6/2001 | Richards et al. |
| 6,275,517 B1 | 8/2001 | Izumi |
| 6,490,262 B1 * | 12/2002 | Hogger .................. 370/337 |
| 6,549,784 B1 | 4/2003 | Kostic et al. |

FOREIGN PATENT DOCUMENTS

| | | |
|---|---|---|
| DE | 195 37 361 | 4/1997 |
| EP | 0182762 | 5/1986 |
| EP | 0622918 | 11/1994 |
| EP | 0767550 | 4/1997 |
| GB | 2 228 163 | 8/1990 |
| GB | 2 261 141 | 5/1993 |
| GB | 2277231 | 10/1994 |
| GB | 2 292 048 | 2/1996 |
| GB | 2 314 746 | 1/1998 |
| GB | 2 315 197 | 1/1998 |
| GB | 2340695 | 2/2000 |
| GB | 2 365 710 | 2/2002 |
| GB | 2 386 517 | 9/2003 |
| JP | 2-179045 | 7/1990 |
| JP | 6177863 | 6/1994 |
| JP | 07297761 | 11/1995 |
| JP | 09020086 | 1/1997 |
| JP | 09298463 | 11/1997 |
| JP | 10093540 | 4/1998 |
| JP | 10178458 | 6/1998 |
| JP | 110112982 | 4/1999 |
| JP | 200216760 | 8/2000 |
| WO | WO 92/12481 | 7/1992 |
| WO | WO 95/08246 | 3/1995 |
| WO | WO 95/33320 | 12/1995 |
| WO | WO 95/34960 | 12/1995 |
| WO | WO 98/04063 | 1/1998 |
| WO | WO 99/38344 | 7/1999 |
| WO | WO 99/49587 | 10/1999 |
| WO | WO 00/51264 | 8/2000 |
| WO | WO 00/70811 | 11/2000 |
| WO | WO 01/52466 | 7/2001 |
| WO | WO 01/73956 A2 | 10/2001 |
| WO | WO/01/97385 | 12/2001 |

OTHER PUBLICATIONS

Bluetooth Specification Version 1.0 B "Part B Baseband Specification," 56-69 (Bluetooth SIG, Inc., Nov. 29, 1999).

http://www.sysopt.com/articles/bluetooth/index2.html.

Harrtsen et al. "Bluetooth: Vision, Goals, and Architecture", Mobile Computing and Communications Review, vol. 1, No. 2, pp. 1-8.

* cited by examiner

METHOD FOR AVOIDING INTERFERENCE IN A DIGITAL COMMUNICATION SYSTEM

BACKGROUND OF THE INVENTION

1. Field of the Invention

This invention relates generally to wireless digital communication systems. In particular, the invention discloses a technique for increasing the performance of a wireless communication link operating in the presence of an external source of intermittent interference.

2. Description of the Prior Art

Cordless telephones have become increasingly popular in recent years. As improved technology is incorporated into cordless telephone designs, their sound quality and reliability have greatly improved, leading to the increasing proliferation and acceptance of cordless telephone devices in residential, and even commercial, environments.

However, as cordless telephones (which operate via a wireless radio frequency (RF) communication link established between the phone handset and a base unit) and other wireless devices have become more popular, the electromagnetic spectrum over which such devices communicate has, in turn, become increasingly crowded. Additionally, increasing numbers of other electronic devices are being used throughout society. Many such devices radiate electromagnetic energy that "pollutes" the spectrum over which wireless devices must communicate. As a result of these spurious transmissions and radiated noise, wireless devices commonly experience crosstalk and interference that inhibits the accurate and reliable transmission of signals.

In order to reduce the crowding of the electromagnetic spectrum designated for use by cordless telephones and other personal wireless devices, numerous frequency domain interference avoidance techniques, such as dynamic channel allocation, have been developed. Such techniques typically involve altering of the radio frequencies corresponding to the "channels" over which a wireless device communicates in an attempt to avoid externally generated radiated electromagnetic energy. Also, additional frequency bands have been allocated for personal wireless communications devices, thereby spreading out device traffic and reducing the potential for interference.

Systems known in the art utilize many techniques to avoid the effects of RF interference that occur in a device's communication band. Many such techniques involve changing the system's frequency domain RF transmission characteristics. For example, calls may be handed off to a different carrier frequency, or noisy channels in the hopping pattern of a frequency hopping spread spectrum system may be substituted for different channels. Such channel substitution techniques are particularly effective in avoiding continuous narrowband sources of interference, such as may be generated by other cordless telephones.

Recently, the 2.4 GHz ISM band has become popular for use by cordless telephones and other wireless devices. Telephones operating in the 2.4 GHz ISM band commonly employ a Time Domain Multiple Access ("TDMA") communication protocol comporting with the Digital Enhanced Cordless Telecommunications ("DECT") standard, as defined in ETSI standard ETS 300 175-2, Section 4.2 (September 1996). Due to the characteristics and regulation of the 2.4 GHz band, devices operating thereon may offer increased range and/or bandwidth compared to other available frequency bands. The DECT standard is being widely adopted throughout the world for wireless applications including cordless telephones, wireless offices and wireless telephone lines to the home. The DECT standard allows for multiple communication links between devices on a single RF carrier frequency through the use of time domain multiplexing. Following the success of DECT in Europe, Africa and South America, a variant of DECT has been developed for the North American market called Worldwide Digital Cordless Telecommunications (WDCT). The WDCT standard is currently becoming popular for use at the 2.4 GHz ISM band.

However, one substantial difficulty faced by designers of electronic equipment utilizing the 2.4 GHz ISM band is interference generated by operation of a common household microwave oven. During their operation, microwave ovens generate substantial levels of RF energy throughout the 2.4 GHz frequency range. Therefore, when a microwave oven is in operation, a nearby, active 2.4 GHz cordless telephone of prior art design would commonly experience substantial interference. Such interference would degrade the sound quality of the telephone call to an objectionable, if not unusable, level. The impact of microwave oven radiation on cordless telephone operation is particularly significant when users place the cordless telephone base unit directly on top of a microwave oven. In certain circumstances, it is possible that a cordless telephone call conducted in the presence of microwave oven generated interference would be dropped altogether.

Prior art frequency domain interference avoidance techniques are of limited effectiveness in the presence of an interference source that emits interfering energy over a substantial portion of a communication band. It is estimated that a microwave oven may radiate substantial levels of interfering RF energy on a majority of the frequency channels defined in the 2.4 GHz ISM band.

Accordingly, it is an object of this invention to provide a method that can be used in conjunction with a wireless communications system to avoid electromagnetic interference radiated by a microwave oven, or similar source.

In addition to reliability and sound quality, power efficiency of a cordless telephone handset is an important consideration in cordless telephone design. Cordless telephone customers demand telephones with extended battery life, such that talk time and time between required charging of the telephone handset needs to be as great as possible. However, consumers also desire compact and light weight portable telephone handsets, which, in turn, limits the physical size and, in turn, the electrical capacity of the battery that may be incorporated. While compact, high energy density battery technologies are one solution, they tend to be expensive, thereby increasing the cost of a cordless telephone that uses high density batteries to extend talk time. Therefore, it is highly desirable, and therefore it is an object of this invention, to provide a cordless telephone design that is power efficient.

Finally, some advanced wireless communications systems utilize multiple communication links over a single time domain multiplexed data frame. For example, advanced cordless telephone base units may support multiple portable handsets; wireless data communications may involve multiple devices on different time slots of a common carrier, and Wireless Local Loop technology may provide wireless telephone line service to a plurality of handsets in one or more homes using a common RF carrier. Therefore, it is an object of this invention to provide an interference avoidance technique that efficiently utilizes the capacity of a communications channel.

These and other objects of this invention will become apparent to those of ordinary skill in the art in view of the invention described herein.

SUMMARY OF THE INVENTION

The invention allows a digital communications system to avoid interference that is comprised of short periodic bursts of energy, such as that emitted by a microwave oven onto many frequency channels of the 2.4 GHz ISM frequency band. Upon detecting the presence of such interference, the transmitter is assigned two separate time slots in a time domain multiple access communications link. The slots are separated in time by a period greater than the duration of one of the interference bursts to be avoided. In accordance with one aspect of the invention, each transmitted data packet can be transmitted during both assigned time slots, so that at most one of the transmitted packets can be corrupted by an interference burst. When the periodicity of the interference bursts is identified, a transmitter can be instructed to transmit each data packet only once, on an assigned time slot that will not be affected by the interference burst. Finally, in accordance with another aspect of the invention, the communication system may synchronize to periodic interference bursts to increase the capacity of the communication system during the interference condition. The interference bursts are centered on one or more fixed time slots in the data frame, such that communications can occur in the remaining time slots without doubling the bandwidth assigned to each communication link by assigning redundant time slots.

DETAILED DESCRIPTION OF THE DRAWINGS

Figure 1:
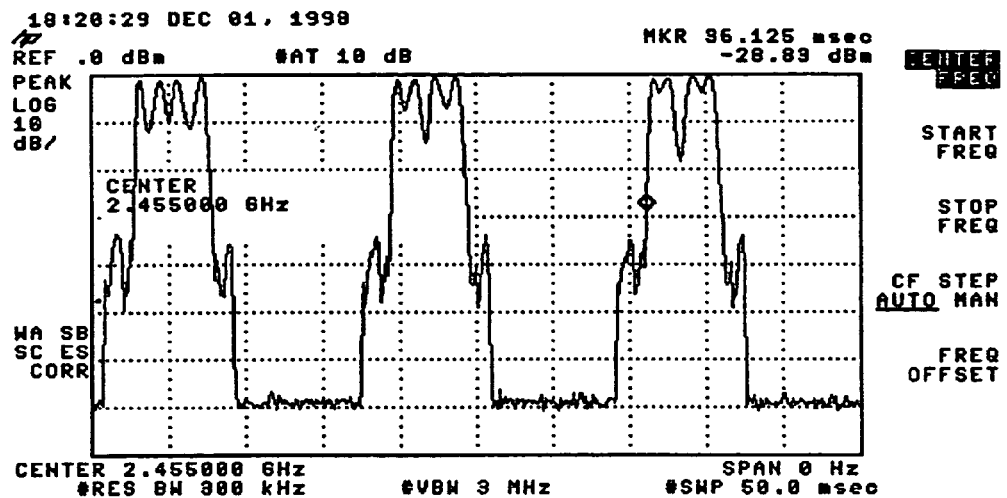
FIG. 1 is a time-domain graph of electromagnetic energy radiated from a microwave oven according to a first characteristic of the microwave radiation.

While this invention is susceptible to embodiment in many different forms, there are shown in the drawings and will be described in detail herein several specific embodiments. The present disclosure is to be considered as an exemplification of the principle of the invention intended merely to explain and illustrate the invention, and is not intended to limit the invention in any way to embodiments illustrated. In particular, while the invention is described herein in the context of a 2.4 GHz WDCT cordless telephone embodiment, it is understood that the invention disclosed could be applied to any time duplexed communications link operating in the presence of intermittent broad-band interference.

A microwave oven emits high levels of electromagnetic energy centered around the 2.4 GHz frequency range while in use. The electromagnetic radiation emitted by a microwave oven is periodic in time, having a cycle frequency equal to the frequency of the AC power supply to the microwave oven—typically 60 Hz in North America. Two primary time domain characteristics of this electromagnetic radiation have been identified as interfering with wireless communications conducted in the 2.4 GHz ISM band. What is termed "segment A" radiation is depicted by the time domain power meter graph illustrated in FIG. 1, and occupies a substantial portion in the time domain of the channels on which it appears. Segment A radiation is comprised of high level emission on numerous frequencies around 2.4 GHz for approximately one half of the duration of an AC power cycle, or about 8 ms, during which time the microwave oven magnetron is powered. This high level emission is followed by an absence of emission for the remaining half of each cycle, during which time the microwave magnetron is not powered.

It has been observed that segment A radiation appears on a limited number of frequency channels utilized by 2.4 GHz WDCT cordless telephones. In particular, segment A radiation has been observed to interfere with approximately 10 of the 94 cordless telephone channels defined in the 2.4 GHz ISM band. Therefore as a practical matter, segment A radiation can be effectively avoided by implementing known frequency domain interference avoidance techniques, such as a frequency hopping dynamic channel allocation algorithm, which avoid any communication over the susceptible channels in the presence of segment A radiation. Thus, for a system operating in the 2.4 GHz ISM band, such a prior art technique would result in the ability to transmit information over one or more of the 84 remaining channels identified as not being subject to segment A radiation.

Figure 2:
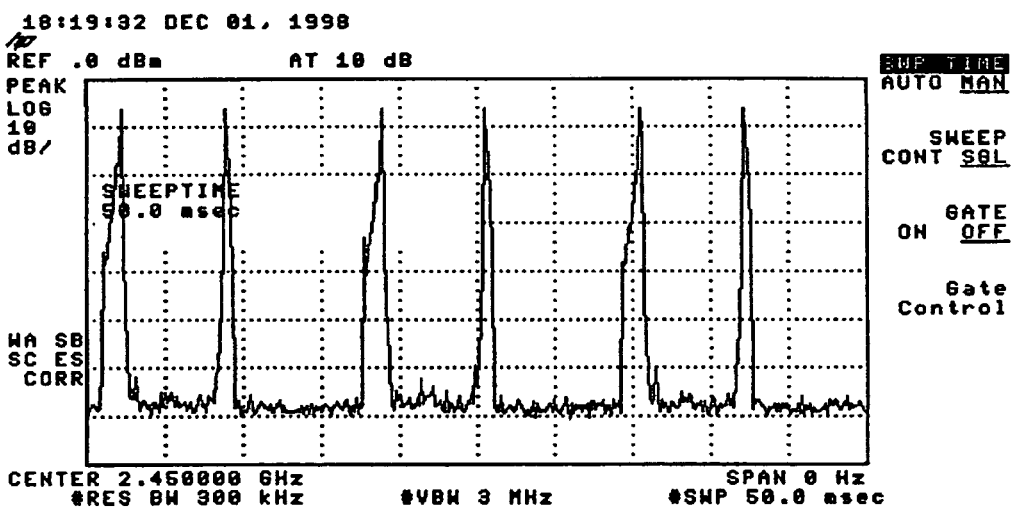
FIG. 2 is a time-domain graph of electromagnetic energy radiated from a microwave oven according to a second characteristic of the microwave radiation.

Microwave ovens have also been observed to generate electromagnetic radiation demonstrating a second characteristic, referred to herein as segment B radiation, which is depicted by the time domain graph illustrated in FIG. 2. One period of segment B radiation is comprised of two high-level bursts of energy approximately 1 ms in duration, occurring at the beginning and at the end of the half of the AC power cycle during which the microwave magnetron is powered.

However, unlike segment A radiation, segment B radiation has been found to interfere with a majority of the 2.4 GHz ISM channels. Prior art frequency domain interference avoidance techniques such as dynamic channel allocation described above, are therefore not effective solutions to isolate the frequency channels susceptible to segment B radiation because such schemes lave too few clean channels available over which communications can be conducted. As a result, systems implementing prior art dynamic channel allocation end up suffering significant levels of periodic interference, and associated high error rate and poor audio quality.

Figure 3:
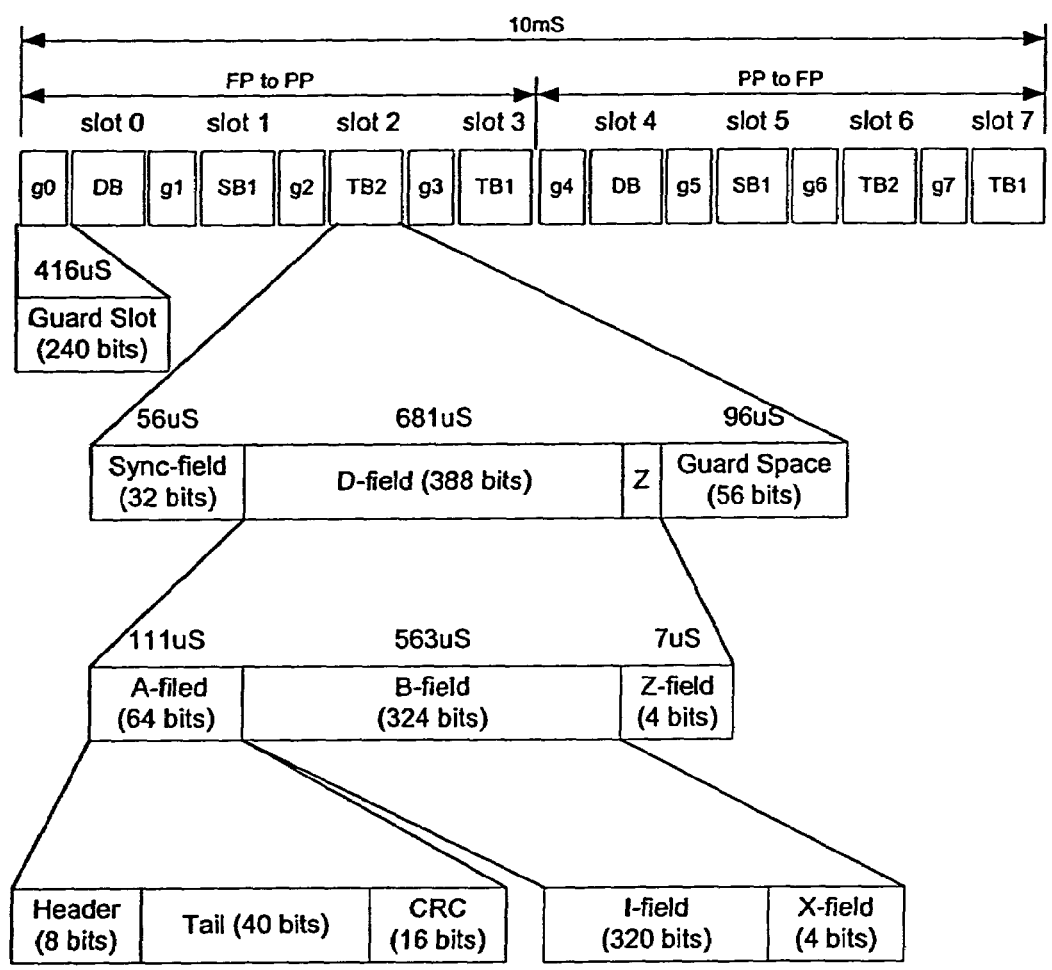
FIG. 3 depicts the format of a WDCT frame.
Figure 5:
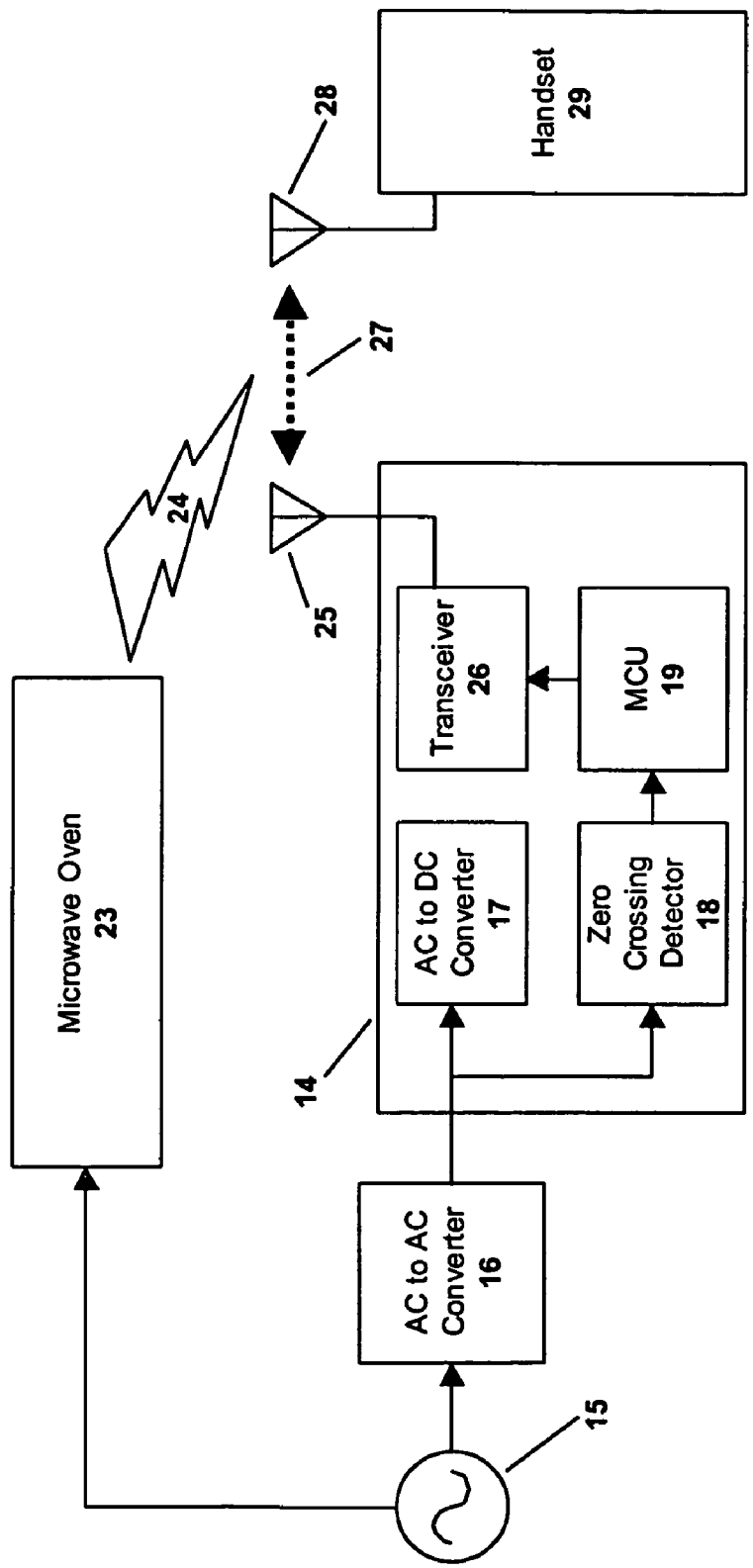
FIG. 5 is a schematic block diagram of a communications system that implements the methods of this invention.

Therefore, this invention provides a time domain method for implementing a reliable wireless communication system using frequency channels susceptible to periodic, bursty electromagnetic interference such as the segment B interference described above. The embodiment depicted in the block diagram of FIG. 5 is a cordless telephone system that employs a TDMA frequency hopping wireless communications link with a WDCT-based frame structure. The composition and timing of a typical WDCT data frame is disclosed in FIG. 3.

Figure 4:
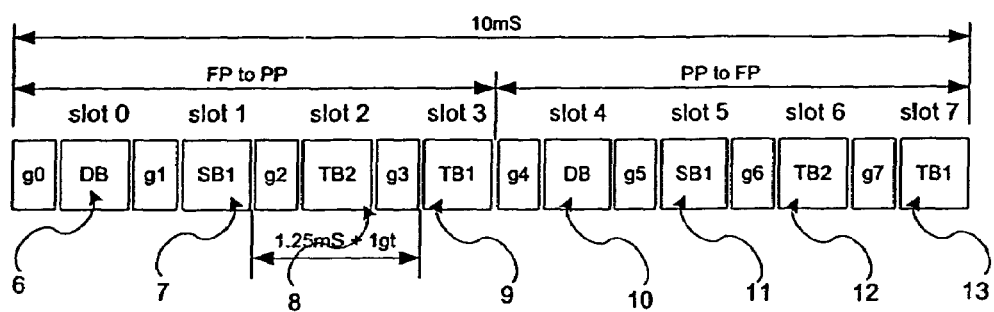
FIG. 4 shows the WDCT frame slot utilization during enhanced mode operation.

FIG. 4 depicts the WDCT frame structure with which the cordless telephone system of FIG. 5 conducts calls. The frame supports four physical links. During normal operation in the absence of segment B interference, transmissions from base unit 14 to portable unit 29 (the "downlink") are assigned to one of time slots 6, 7, 8 or 9. Each time slot is preceded by a 416 µs-guard band, during which time communication does not occur. Communications from portable handset 29 to base unit 14 ("uplink") are assigned to time slots 10, 11, 12 or 13 accordingly. Therefore, during normal operation, base unit 14 can support up to four full-duplex communication links to separate handsets.

However, segment B radiation can inhibit reliable communications for the duration of each interference burst—such as when either handset 29 or base unit 14 is located near an active microwave oven. Oftentimes, consumers place base unit 14 directly on top of a microwave oven, thereby further exacerbating the impact of such segment B radiation.

In accordance with one aspect of the invention, the cordless telephone set of FIG. 5 preferably enters an enhanced operation mode upon detection of interference from segment B radiation. Numerous methods can be utilized to determine when the enhanced operation mode should be entered. A basic system can simply count the number of errors on each time slot, and when the number of errors on a given time slot exceeds a predetermined threshold, enhanced mode is initiated. However, such a basic system will utilize enhanced mode in the presence of any type of interference, regardless of whether it is periodic and bursty or not.

An alternative method for detecting segment B interference involves observing and/or recording the timing information when each error occurs, e.g. the packet and timeslot number that was received with an error. Such a system could enter enhanced mode upon observing a series of errors somewhat evenly spaced in time. However, because the time resolution for observing errors is necessarily limited to the duration of a time slot with associated guard band, multiple errors must typically be observed before the interference burst period can be calculated with reasonable accuracy.

A further and preferred example method of detecting the presence of segment B radiation involves observing the time at which packets are incorrectly received with respect to the timing of the AC power line supplying power to the cordless telephone base. Base unit 14 is powered by wall AC power source 15 through AC to AC converter 16. The power input is then routed to AC to DC converter 17 for distribution to the base unit circuitry. The AC power input is also routed to zero crossing detector 18. Zero crossing detector 18 generates an output signal which is applied to an interrupt of microcontroller unit ("MCU") 19, whereby MCU 19 can determine the frequency and polarity of AC power source 15.

Microwave oven 23 is also connected to and powered by AC power source 15. The timing and operation of the magnetron inherent in microwave 23 is dependent upon the frequency and phase of AC power source 15. In turn, the timing of segment B emission 24 is also dependent upon the frequency and phase of AC power source 15. By providing base unit 14 with this information, the timing of received errors with respect to the phase of AC power source 15 can be determined. If errors occur repeatedly at a consistent timing position with respect to the phase of AC power source 15, MCU 19 determines that segment B radiation is present, and signals transceiver 26 to initiate the enhanced mode of operation. After segment B interference is detected once, the base unit may determine that a microwave oven, or other source of periodic interference, is present in the vicinity of the base unit. Accordingly, the base unit may subsequently employ a lower threshold for determining that a segment B interferer is active, such that the enhanced mode of operation is initiated after detection of a lower number of periodic errors.

During the enhanced mode, active physical links between a base unit and portable handset are assigned redundant time slots in the WDCT frame in addition to the primary timeslots upon which they normally communicate. Each transmitted data packet is conveyed independently over both the primary and redundant links. Moreover, in order to ensure that a segment B interference burst does not influence both the primary and redundant timeslots for a given physical link, the timeslots are separated in time by an interval different than that between any two segment B bursts, and greater than the duration of a single segment B burst.

For example, base unit 14 and handset 29 normally communicate on downlink time slot 9 and uplink time slot 13 of communication link 27. Base unit 14 detects segment B radiation 24, and places communication link 27 into enhanced mode. In enhanced mode, each downlink data frame is transmitted twice, on both time slots 7 and 9. Similarly, each uplink data frame can be transmitted twice, on both time slots 11 and 13. Moreover, the period between downlink slots 7 and 9 or uplink slots 11 and 13 is 1.67 ms. The time period between consecutive segment B radiation bursts is approximately 7 ms or 9 ms, and the duration of a segment B radiation burst is typically approximately 1 ms. Therefore, a single segment B radiation burst will not interfere with both primary and redundant uplink or downlink time slots, and two consecutive segment B radiation bursts will not interfere with both primary and redundant uplink or downlink time slots. Therefore, using the timing scheme of the present invention, at least one of the primary or redundant time slots is likely to be communicated across link 27 without interference from segment B radiation 24.

In order to maintain proper operation of the receiver while in enhanced mode, it is desirable to maintain a constant rate stream of data into the receiver Coder/Decoder ("CODEC"). The CODEC is the transceiver component that is responsible for converting received digital data into audible information. A CODEC is typically designed to accept data at a constant, predetermined rate. Accordingly, a buffer is serially incorporated into the CODEC input data path, such that for any given data packet, copies of the packet are received on both the primary and redundant links before one copy is selectively conveyed to the CODEC. The information from a data packet received without error, whether over the primary or redundant time slot, is buffered into the CODEC for playback at a constant rate with timing referenced to the WDCT frame.

While the enhanced mode is effective in ensuring the integrity of communication link 27 in the presence of segment B radiation 24, the enhanced mode operation in the embodiment described inherently requires the transmission of each data packet twice. Typically, a substantial portion of the power required to operate a portable handset is used to transmit RF signals. Therefore, enhanced mode operation may substantially increase the power required to operate handset 29, and in turn reduce its talk time and battery life.

Therefore, in accordance with another aspect of this invention, the enhanced mode can be implemented in a manner eliminating the requirement that handset 29 transmit each data packet twice if handset 29 determines the periodic timing of the interference source. By measuring the timing of the segment B interference bursts, as described above in reference to the detection of segment B interference, a transceiver can pre-determine with which, if any, of the uplink time slots the segment B burst will interfere. The handset then transmits only on the uplink time slot that will not suffer from segment B interference.

In the previously-described embodiment in which base unit 14 directly measures the timing of AC power source 15, base unit 14 must transmit information to handset 29 indicative of the determined segment B interference timing. Thus, during enhanced mode operation, base unit 14 specifies to handset 29 the time slot upon which the handset shall transmit. In particular, a field in the downlink packet header is utilized to specify which of the active uplink time slots should be utilized by handset 29 to transmit its data packet. Furthermore, to avoid potential synchronization problems when two portable handsets are transmitting at the same time on the same RF channel, handset 29 does not transmit at all unless and until it receives a time slot assignment in the packet header from base unit 14. By carefully limiting handset transmissions to known "clear" time slots, handset power is conserved and system reliability is improved.

Although the handset transmitter operates on only one of two potential uplink time slots, in the embodiment illustrated the handset receiver continues to monitor both downlink time slots. Such operation may be desirable inasmuch as receiver circuits typically draw far less power than transmitters, and robustness of the communication link is improved since the base unit can attempt to contact the portable unit via either or both time slots. Furthermore, by actively receiving communications on both the primary and redundant time slots, handset 29 and/or the base unit 14 can determine when communications over both time slots are consistently being received without error, indicating that the segment B interference source is no longer present. At this time, handset 29 and base unit 14 can reenter the normal, non-redundant communications mode.

While the enhanced mode as has been described is effective in avoiding the effects of segment B radiation for a given communications link, the use of redundant time slots for each link reduces the number of connections available within the WDCT frame by half. However, in some systems this problem can be mitigated by synchronizing the transmission frame to the timing of the segment B radiation. The WDCT frame is modified by altering its duration. The frame duration can be controlled to align the frame timing such that the segment B bursts are centered within a single fixed time slot in each frame. Communications over other uncorrupted timeslots can then be conducted in standard mode, avoiding the need to assign a redundant time slot to every active communication link.

In accordance with this aspect of the invention, a detection circuit that includes AC to AC converter 16 and zero crossing detector 18 for detecting the timing of AC power source 15 is employed to provide the timing to MCU 19. MCU 19 then identifies the phase shift inherent between the AC power as detected by MCU 19, and the AC power as applied to the magnetron of microwave oven 23 by monitoring the timing of detected segment B radiation bursts. MCU 19 then controls the communication link data timing such that the center of a predetermined time slot is aligned with a segment B radiation burst, as depicted in FIG. 6.

Figure 6:
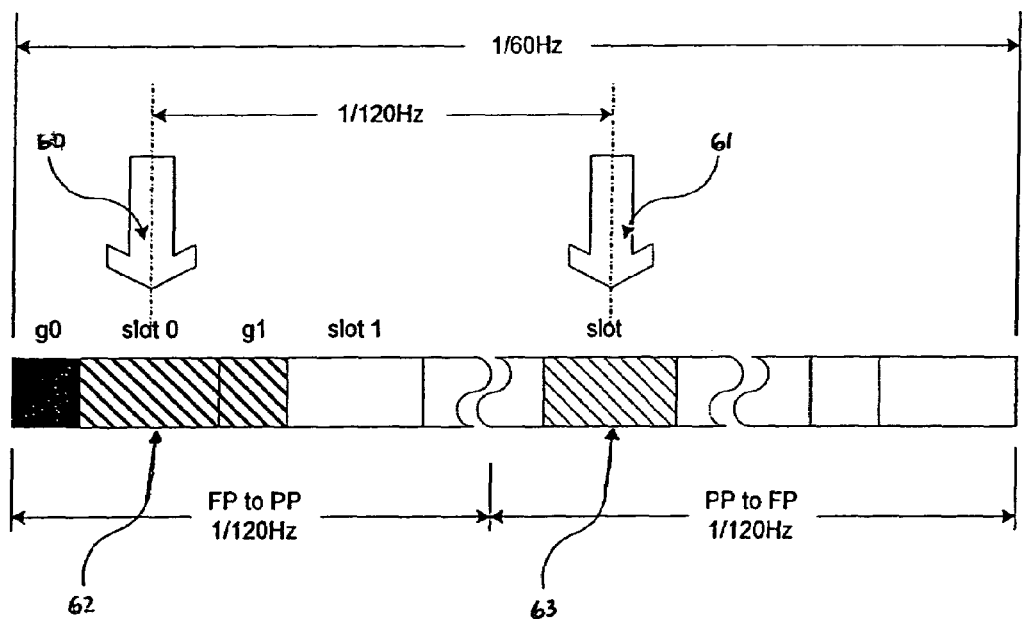
FIG. 6 depicts the system frame format upon synchronization with a source of periodic burst interference.

FIG. 6 depicts a time domain graph of a data frame in a system that has been synchronized with the segment B radiation pattern, which is inherently synchronized with the 60 Hz AC power source. Segment B bursts 60 and 61 are spaced approximately every 8.3 ms, or half the period of the AC power cycle. The frame duration is 1/60 Hz, or about 16.67 ms. Using a WDCT-type frame structure with modified timing that includes four downlink slots and four uplink slots, each data time slot has a duration of approximately 1.39 ms, and is surrounded on each side by 693 μs guard bands. By synchronizing the frame timing so that segment B burst 60 is centered in the time period of downlink slot 62, and by centering segment B burst 61 within uplink slot 63, the segment B radiation pattern only eliminates one uplink-downlink timeslot pair. Therefore, communications can be conducted on all other time slots by using any of 84 channels in standard mode—without the doubled bandwidth otherwise inherent in enhanced mode operation.

It is recognized that the technique described herein could be used in conjunction with alternative frame timing formats to minimize the need for enhanced mode operation. For example, the frame length could be established as any integer multiple or divisor of the segment B radiation period. To the extent that alignment of segment B bursts within the transmission frames remains constant over time, standard mode communications can be conducted on remaining clear time slots, and a net capacity improvement over full enhanced mode operation can be seen.

The foregoing description and drawings merely explain and illustrate the invention and the invention is not limited thereto except insofar as the appended claims are so limited, inasmuch as those skilled in the art, having the present disclosure before them will be able to make modifications and variations therein without departing from the scope of the invention.

I claim:

1. A method for transmitting information over a time duplexed communications link subject to interference from a broadband interference source, comprising:
   connecting a base unit communicating over the duplexed communications link to an AC power source that powers the broadband interference source;
   detecting a consistent timing of data packets received with errors over the communications link at regular intervals, wherein a segment B interferer is determined to be active, wherein detecting consistent timing comprises:
      observing a time at which the data packets are received in error,
      receiving phase information of the AC power source,
      comparing the phase information of the AC power source to the time at which the data packets are received in error, and
      determining that the data packets are received in error repeatedly at a consistent timing position with respect to the phase of the AC power source;
   switching operation of the duplex communications link to an enhanced mode, wherein active physical links between the base unit and a portable handset are assigned redundant time slots in addition to primary timeslots used for communication between the base unit and handset; and
   lowering a threshold for determining the segment B interferer to be active, wherein the enhanced mode is initiated after detection of a lower number of periodic errors;
   wherein the phase information of the AC power source is provided by an output signal of a zero crossing detector.

2. The method of claim 1, wherein the enhanced mode operation comprises:
   transmitting the information within a first assigned time slot of the time duplexed communications link;
   assigning a second time slot of the time duplexed communications link upon which a redundant copy of the information is to be transmitted, wherein a spacing between the first and the second time slot is greater than a duration of a segment B radiation burst and different than predetermined intervals between successive segment B radiation bursts; and transmitting the redundant copy of the information within the second time slot of the time duplexed communications link.

3. The method of claim 2, wherein intervals between successive segment B radiation bursts alternate between about 7 msec and about 9 msec.

4. A method for transmitting information over a time duplexed communications link subject to interference from a broadband interference source, comprising:

connecting a base unit communicating over the duplexed communications link to an AC power source that powers the broadband interference source;

detecting a consistent timing of data packets received with errors over the communications link at regular intervals, wherein a segment B interferer is determined to be active; and switching operation of the duplex communications link to an enhanced mode, wherein active physical links between the base unit and a portable handset are assigned redundant time slots in addition to primary timeslots used for communication between the base unit and handset, and wherein the enhanced mode operation comprises:

transmitting a primary copy of a downlink data packet from the base unit to a handset within a first downlink time slot of the time duplexed communications link;

assigning a second downlink time slot of the time duplexed communications link upon which a redundant copy of the downlink data packet is to be transmitted;

transmitting the redundant copy of the downlink data packet within a second downlink time slot of the time duplexed communications link;

receiving an uplink data packet at the base unit that is transmitted from a handset over a first uplink time slot, wherein an assignment of the uplink time slot is sent by the base unit in a message to the handset before transmission of the uplink data packet.

5. The method of claim 4, wherein the message is contained in downlink packet header.

6. The method of claim 4, wherein the handset does not transmit until receiving the assignment of the uplink time slot.

7. A system for transmitting information over a time duplexed communications link that is subject to periodic radiation bursts, comprising:

a transceiver in a base unit configured to operate the time duplexed communications link in a standard or enhanced mode;

an AC to AC converter coupled to an AC power supply that powers the base unit and a source of the periodic radiation bursts;

a microcontroller (MCU) unit that controls operation of the transceiver, a zero crossing detector that generates a signal to the MCU for determining a frequency and polarity of the AC power source, wherein a timing of transmission errors received at the base unit with respect to a phase of the AC power source is determined;

a CODEC device configured to convert digital data contained in the transmitted information into audible information;

a buffer device serially incorporated into a data path of the CODEC device, the buffer configured to buffer the information for playback at a constant rate, wherein the enhanced mode comprises:

transmitting a first copy of the information within a first time slot of the time duplexed communications link;

assigning a second time slot of the time duplexed communications link upon which a redundant copy of the information is to be transmitted, wherein a spacing between the first and the second time slot is greater than a duration of the periodic radiation burst and different than predetermined intervals between successive segment periodic radiation bursts; and transmitting the redundant copy of the information within the second time slot of the time duplexed communications link.

8. The system of claim 7, wherein the time duplexed communications link comprises a WDCT frame structure.

9. The system of claim 7, wherein the periodic radiation bursts comprise segment B radiation bursts.

10. The system of claim 9, wherein the enhanced mode of operation is initiated when a consistent timing position of transmission errors received at the base unit with respect to the phase of the AC power source is observed.

11. The system of claim 7, wherein the information buffered into the CODEC is contained in and selected from one of the first and redundant copies of the information, the selection based on the chosen copy being received without error.

12. The method of claim 4, wherein the time duplexed communications link comprises a WDCT frame structure.

13. The method of claim 4, wherein the enhanced mode of operation is initiated when a consistent timing position of transmission errors received at the base unit with respect to a phase of the AC power source is observed.

* * * * *